(12) United States Patent
Wivagg

(10) Patent No.: US 6,477,220 B1
(45) Date of Patent: Nov. 5, 2002

(54) FLEXIBLE PENETRATION ATTACHMENT FOR STRAINERS

(75) Inventor: Adrian P. Wivagg, Tolland, CT (US)

(73) Assignee: Westinghouse Electric Co. LLC, Pittsburgh, PA (US)

(*) Notice: Subject to any disclaimer, the term of this patent is extended or adjusted under 35 U.S.C. 154(b) by 0 days.

(21) Appl. No.: 09/205,687

(22) Filed: Dec. 4, 1998

Related U.S. Application Data
(60) Provisional application No. 60/074,178, filed on Feb. 10, 1998.

(51) Int. Cl.[7] .............................. G21C 9/00; F16L 5/00
(52) U.S. Cl. .................... 376/282; 376/283; 285/139.2; 285/225
(58) Field of Search ................. 285/225, 229, 285/136.1, 139.1, 139.2, 139.3; 376/282, 283, 203, 204

(56) References Cited

U.S. PATENT DOCUMENTS

| | | | | |
|---|---|---|---|---|
| 1,117,962 A | * | 11/1914 | Phillips, Jr. ................. 285/225 |
| 1,923,124 A | * | 8/1933 | Stanley ....................... 285/225 |
| 2,841,419 A | * | 7/1958 | Jay ............................. 285/225 |
| 3,369,829 A | * | 2/1968 | Hopkins .................... 285/227 |
| 3,934,904 A | * | 1/1976 | Hord .......................... 285/158 |
| 4,363,505 A | * | 12/1982 | Smith ......................... 285/369 |
| 4,846,509 A | * | 7/1989 | Moore ........................ 285/225 |
| 5,704,656 A | * | 1/1998 | Rowe .......................... 285/93 |
| 5,826,919 A | * | 10/1998 | Bravo et al. ............. 285/139.2 |

FOREIGN PATENT DOCUMENTS

JP 10274371 * 10/1998 ........... F16L/27/06

OTHER PUBLICATIONS

Frank Rahn, et al., "A Guide to Nuclear Power Technology," 1992, pp. 371–377.

* cited by examiner

Primary Examiner—Michael J. Carone
Assistant Examiner—Daniel Matz

(57) ABSTRACT

A flexible penetration attachment for BWR wet-well strainers is provided that causes a suction pipe to communicate with liquid in the wet-well through an aperture in a wet-well wall. The penetration includes a boot for defining an outer circumference of the aperture. A suction pipe having an outer surface extends through the aperture such that an annular space is defined between the aperture outer circumference and the suction pipe outer surface. A resilient seal having a generally U-shaped cross section with first and second ends is placed within the annular space. The first end is fixedly secured to the outer surface of the suction pipe and the second end is fixedly secured to the aperture outer circumference such that the suction pipe may move in response to a force applied to the suction pipe.

19 Claims, 4 Drawing Sheets

FLEXIBLE PENETRATION ATTACHMENT FOR STRAINERS

CROSS REFERENCE TO RELATED APPLICATIONS

This application is related to and claims priority based upon U.S. Provisional Application No. 60/074,178, filed on Feb. 10, 1998.

FIELD OF THE INVENTION

The present invention relates generally to the field of suction lines, and more particularly, relates to suction lines employed in suppression pools of a boiling water reactor (BWR) nuclear power plant.

BACKGROUND OF THE INVENTION

Boiling water reactors are operated within a containment or reactor building. The containment structure is a physical boundary against release of fission products to the environment following an inadvertent release of those products from a reactor coolant system. The containment structure with its associated systems is designed to withstand a set of postulated internal and external loads and to effectively contain radioactivity that may be released from the primary system. It also provides a shielding function, namely the protection of personnel from exposure to radioactivity contained inside the containment.

Nearly all operating BWR plants have a pressure suppression primary containment consisting of a "dry-well" containing the reactor vessel and primary systems components, and a suppression pool or "wet-well" containing a large volume of water to condense steam discharged from the primary systems. The wet-well also serves as a short term heat sink. A variety of pressure suppression primary containment designs are used in BWR plants; however, substantially all are functionally similar and all are within a secondary containment.

The suppression pool water (i.e. wet-well water) also provides a source of water for one or more emergency core cooling systems (ECCS). An ECCS is designed to inject water back into the reactor vessel to make up for lost water in the event of a loss of coolant accident (LOCA). The ECCS also re-circulates water through the core following a LOCA to provide for long term post-accident core cooling. To accomplish these purposes, the ECCS includes a plurality of suction lines that penetrate and draw water from the wet-well. In order to protect the integrity of the ECCS components, and to prevent blockage of the suction lines, the suction lines are provided with strainers to filter out harmful debris.

It has been recognized that conventional suction strainers installed on ECCS suction lines currently installed in BWR plants might not be able to handle the amount of debris expected to result from a LOCA. As a result, conventional strainers are being replaced with trains of strainers that are much larger and heavier. The replacement trains of strainers connect to a suction pipe system through a penetration in the wet-well wall. Because of their larger size, the trains include more inertial mass that cause the strainers, and the attached suction pipes, to move significantly during seismic and other events. For example, when a large pressurized pipe ruptures with great force, resulting in an LOCA, the suction strainers in the wet-well are subjected to large hydrodynamic forces that can deflect the suction strainers and subject the attached suction pipes to large reactive forces that may occur in any direction. Conventional penetration designs that link the water in the suppression pool to re-circulation piping are unable to handle the resultant inertial forces acting upon the large trains of strainers.

Penetrations in the wet-well are themselves complex connections that must be properly designed and installed to avoid leakage. Such penetrations must accept any applied load in any direction, and also must prevent leaks. Existing penetrations are not likely to be able to support new loads caused by the greater weight of the new trains of strainers attached to each penetration.

SUMMARY OF THE INVENTION

It is therefore an overall object of the invention to provide a flexible penetration attachment for attaching large trains of strainers to a boiling water reactor wet-well suction pipe.

It is a further object of the invention to provide a flexible penetration attachment that is structurally able to accept any loads in any direction acting upon large trains of strainers.

It is still another object of the invention to provide a flexible penetration attachment that avoids leakage while accepting any loads in any direction acting upon large trains of strainers.

These and other objects of the present invention are realized through a flexible penetration attachment for strainers that allows a suction pipe to communicate with liquid in a wet-well through an aperture in the wet-well wall. The penetration includes a boot, preferably fabricated as a unit, for defining an outer circumference of the aperture. Suction pipe extends through the boot such that an annular space is defined between the aperture outer circumference and an outer surface of the suction pipe. A resilient seal having a generally U-shaped cross section with first and second ends is placed within the annular space. The first end is fixedly secured to the outer surface of the suction pipe and the second end is fixedly secured to the aperture outer circumference. The resilient nature of the seal allows the suction pipe to move a pre-determined distance in response to a force in a radial or transverse direction. Securing the resilient seal between the outer surface of the suction pipe and the aperture outer circumference also allows the suction pipe to move a predetermined amount in response to a rotational force. The resilient seal thus prevents leakage from the suppression pool while allowing the suction pipe to move in response to all forces placed upon it.

A flexible penetration attachment as described herein may therefore be used to connect replacement trains of strainers in a wet-well pool with ECCS suction lines through existing wet-well penetrations. The resilient seal flexes in response to transverse, lateral and rotational applied loads. As a result, the flexible penetration attachment minimizes leakage through the penetration while absorbing loads applied to the combined trains of strainers and the suction line.

BRIEF DESCRIPTION OF THE DRAWINGS

The features and inventive aspects of the present invention will become more apparent upon reading the following detailed description, claims and drawings, of which the following is a brief description.

FIG. 1, including

DETAILED DESCRIPTION OF PREFERRED EMBODIMENTS

Figure 1A:
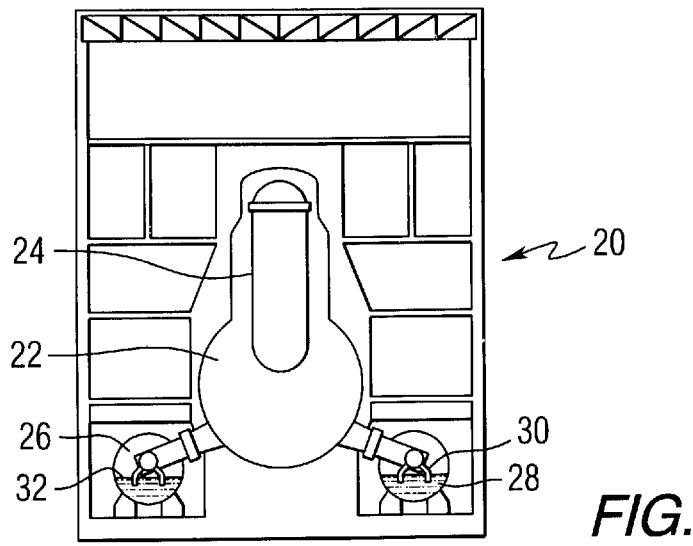
FIG. 1a, FIG. 1b and FIG. 1c, shows cutaway views of three common BWR Pressure Suppression Containments.
Figure 1B:
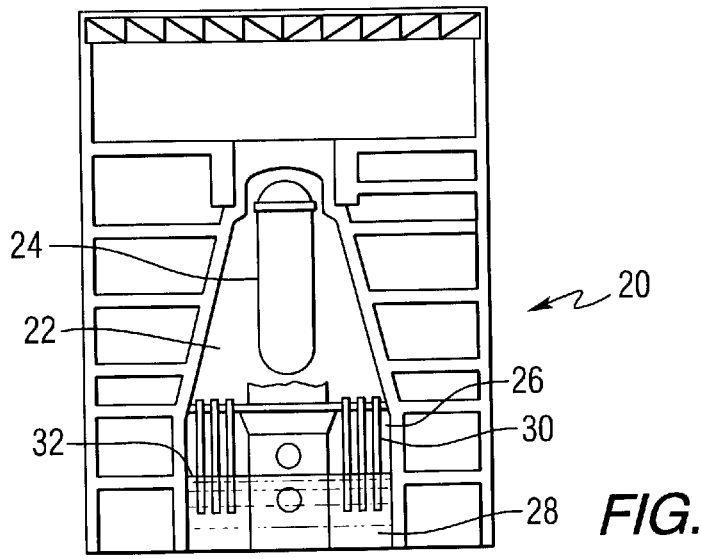
Figure 1C:
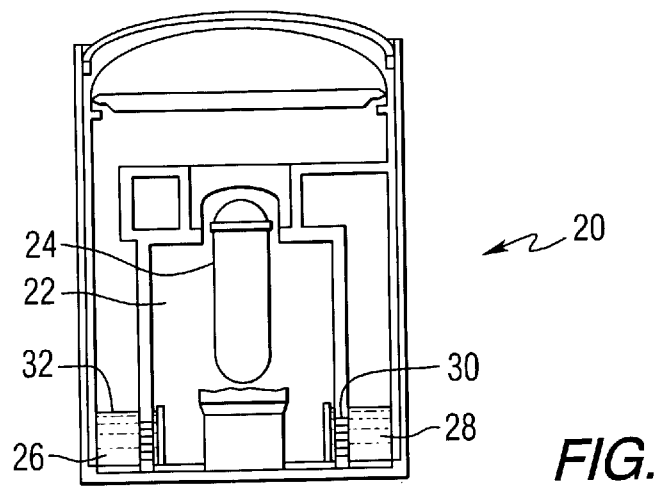
Figure 2:
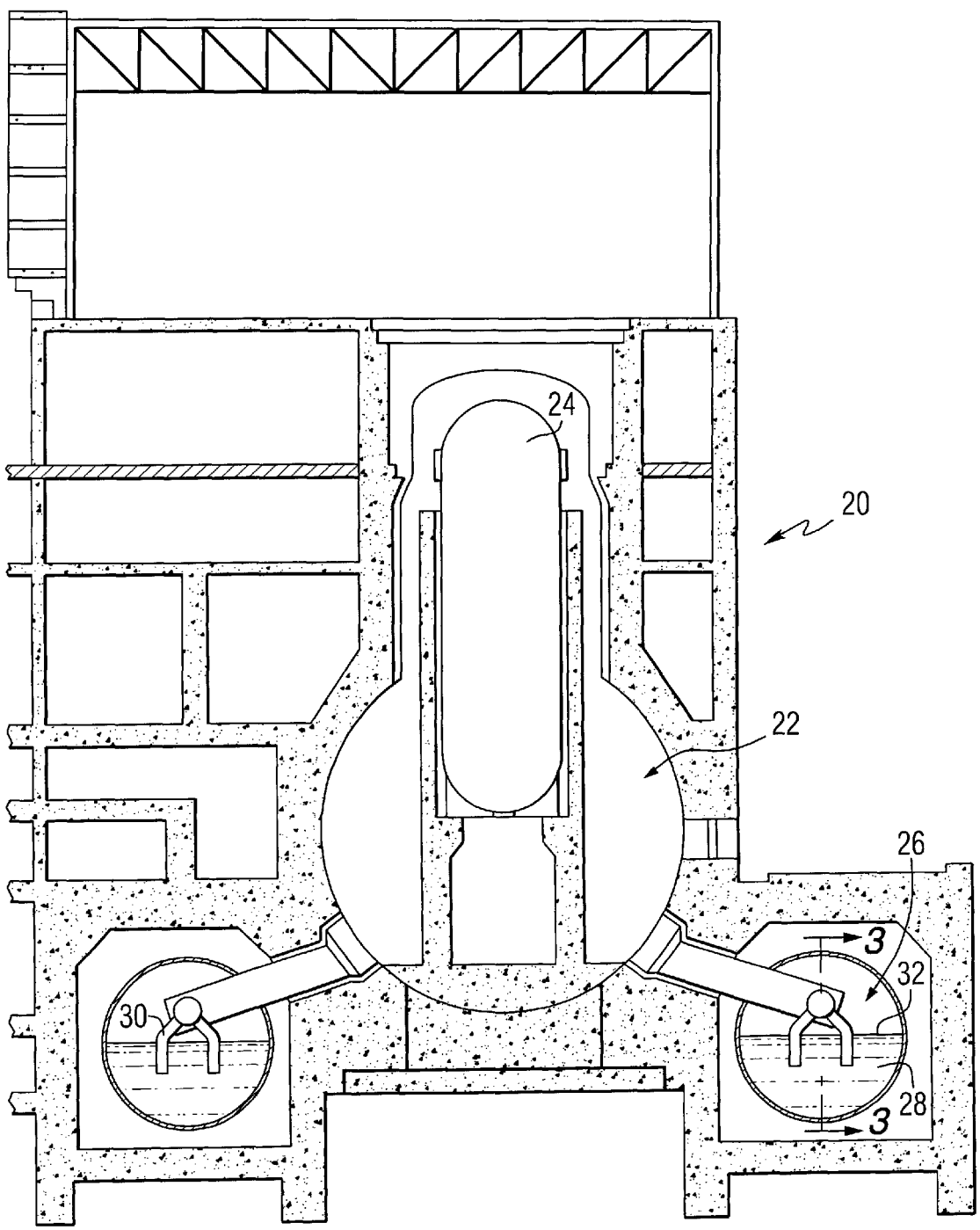
FIG. 2 is an enlarged cutaway view of a general arrangement of a predominant BWR containment.

The first BWR plants used a steel containment in the shape of an inverted light-bulb, completely surrounding any reactor vessel pressure relief valves on all main steam lines, and also fully enclosing a coolant re-circulation system. Several containment designs are currently used, as shown in FIGS. 1a through 1c. The containment shown in FIG. 2 is the predominant type of BWR containment. With reference to FIGS. 1 and 2, wherein like numerals denote like structures, a BWR containment 20 generally is divided into two chambers: a dry-well 22 that houses a reactor vessel 24 and other primary system components; and a generally toroidal suppression chamber 26, also known as a "wet-well", which contains a pool of water 28 used for pressure suppression and as a heat sink.

If a pipe rupture occurs inside a containment 20, the dry-well 22 becomes pressurized by steam blowing down from a primary coolant system. The steam enters a plurality of downcomers 30 and is routed to each wet-well 26 where it is discharged beneath the water surface 32 of a pool 28. The pool 28 is designed to condense the steam discharged to the wet-well 26 and thus mitigate a post-accident containment pressure transient.

The pool 28 also provides a source of water for an emergency core cooling system (ECCS) (not shown). The ECCS is designed to inject water back into the reactor vessel to make up for lost water in the event of a loss of coolant accident (LOCA). The ECCS also re-circulates water through the core following a LOCA to provide for long term post-accident core cooling.

Figure 3:
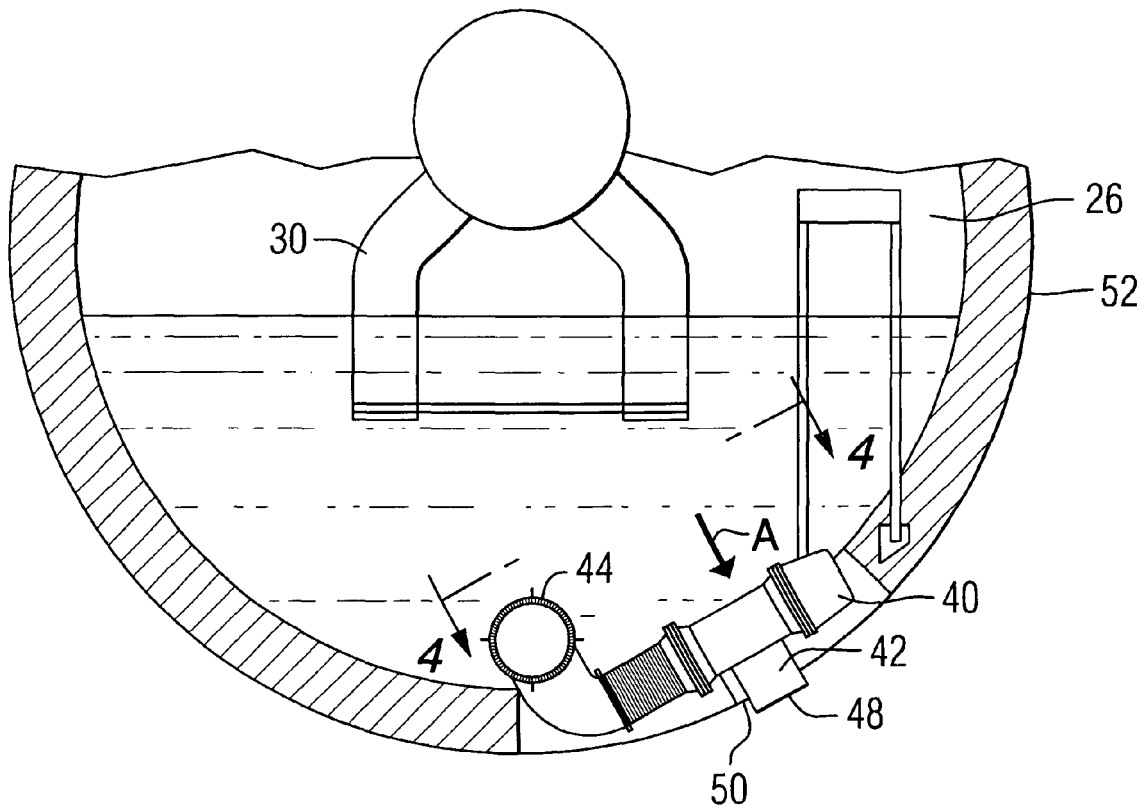
FIG. 3 is a partial cross-sectional view of a wet-well including suction penetrations taken along section line 3—3 of FIG. 2.
Figure 4:
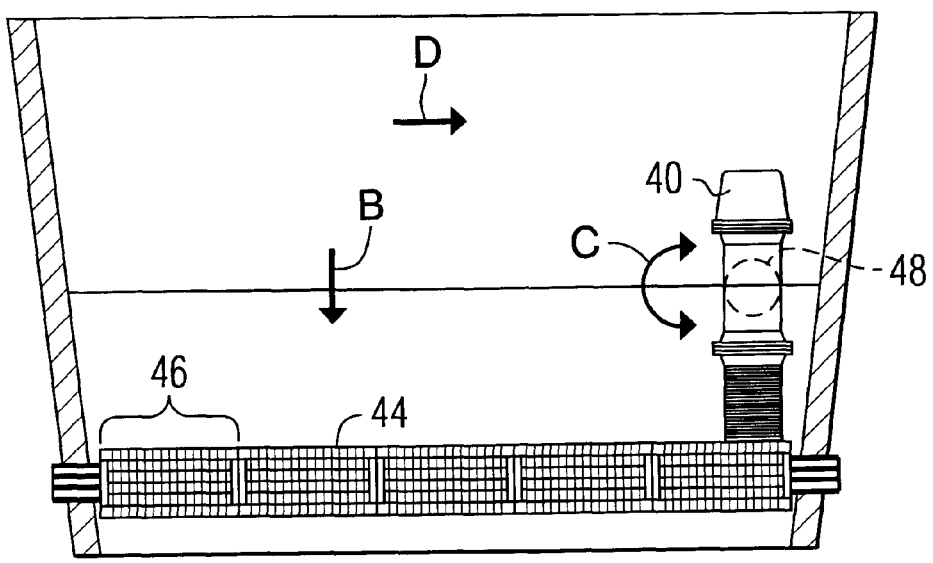
FIG. 4 is a cross-sectional view of a strainer assembly taken along line 4—4 of FIG. 3.

A LOCA results from a high pressure coolant system pipe rupture. It is postulated that such a rupture will cause large quantities of debris, such as pipe and vessel insulating material, and other solids, to be washed into the wet-well 26. Conventional suction strainers 40 (see FIGS. 3 and 4) installed on ECCS suction lines 42 currently installed in BWR plants may not be able to handle the amount of debris expected to result from a LOCA. As a result, conventional strainers 40 are being replaced with replacement strainers 44 that are much larger and heavier. As best seen in FIG. 4, the replacement strainers 44 consist of multiple strainers 46 strainers formed into trains that connect to a suction pipe 48 through a penetration 50 in the wet-well wall 52. The larger replacement strainers 44 include more inertial mass than the conventional strainers 40 that may cause the strainers 44, and the attached suction pipe 48, to move significant amounts during seismic and other events in response to applied loads. In particular, when a large pressurized pipe ruptures with great force, resulting in an LOCA, the strainers 44 in the wet-well 26 are subjected to large hydrodynamic forces that can deflect the strainers 44 and subject the attached suction pipe 48 to large reactive forces. Forces may be applied to the strainers 44 and the suction pipe 48 in directions indicated by arrows A, B, C and D of FIGS. 3 and 4. The force indicated by arrow A in FIG. 3 acts in a transverse direction, causing the entire suction strainer assembly to move either towards or away from the penetration 50. Additionally, suction pipe 48 moves in response to the transverse force A. Forces applied in directions indicated by arrows B and D of FIG. 4 act on the penetration in a radial direction. Radial forces B and D may also combine to exert a rotational force upon penetration 50, indicated by arrow C in FIG. 4. As seen in the figures, the transverse force A, radial forces B and D and rotational forces C affected the conventional strainers 40. But, when the conventional strainers 40 are replaced by larger, heavier trains of strainers 44, the effect of forces A, B, C and D is magnified and has a greater effect on penetration 50 because the trains 44 have a larger inertial mass. Simply by increasing the size of the strainers 44, conventional penetration designs become unable to handle the expected inertial forces.

Figure 5:
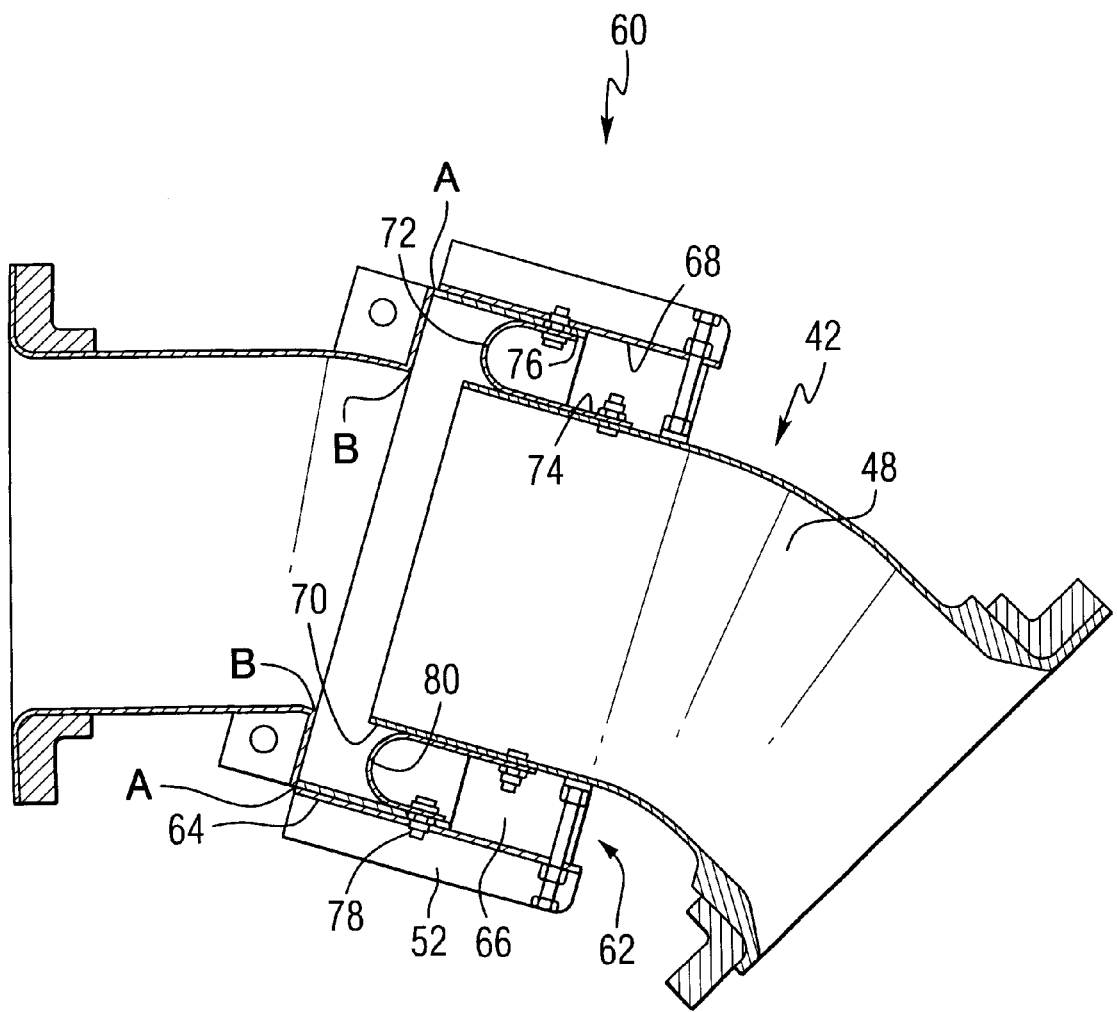
FIG. 5 is a cross-sectional view of a penetration attachment according to the present invention.

Thus, the present invention is directed to a flexible penetration attachment that moves in response to postulated inertial forces acting upon either or both of the strainers 44 and the suction pipe 48. The flexible penetration attachment of the present invention is shown in FIG. 5.

A flexible penetration attachment 60 is shown that allows the suction pipe 48 to communicate with liquid in the wet-well 26 through an aperture 62 in a wet-well wall 52. The penetration attachment 60 includes a boot 64, preferably fabricated, for defining an outer circumference 68 of the aperture 62. Suction pipe 48 extends through the boot 64 to fluidly communicate with the water in the wet-well 26. The outer circumference 68 of the aperture 62 is larger than the outer circumference 70 of the suction pipe 48. As a result, a space 66 is defined between the aperture outer circumference 68 and the outer circumference 70 of suction pipe 48. Because suction pipe 48 usually includes a circular cross-section, space 66 is usually annular, though other geometries may also fall within the objectives of the present invention.

A resilient seal 72, also preferably annular, having a generally U-shaped cross section is placed within the annular space 66. More preferably, resilient seal 72 is fabricated from an elastomeric compound having high strength. The resilient seal 72 includes a first end 74 that is fixedly secured to the outer circumference 70 of the suction pipe 48, and a second end 76 that is fixedly secured to the outer circumference 68 of the aperture 62 defined by the fabricated boot 64. As can be seen from FIG. 5, the resilient seal 72 is fixed only at the first end 74 and at the second end 76. A central portion 80 of the seal 72 is able to flex between the first end 74 and the second end 76 of the seal such that the suction pipe 48 is allowed to move a pre-determined distance in response to a force in any direction. In particular, suction pipe 48 is able to move in the transverse, radial and rotational directions because the suction pipe 48 is not directly secured to the outer circumference 68 of the aperture 62. Instead, because the resilient seal 72 is fixedly attached with straps 78 between the outer circumference 68 of the aperture 62 and the outer circumference 70 of the suction pipe 48, the seal 72 allows the suction pipe to move in response to forces placed upon it. At the same time, the seal 72 prevents leakage from the suppression pool 26 through the annular space 66.

It may be appreciated that the size of the seal 72 and the size of annular space 66 are dependent upon the size of the replacement strainers 44 in each individual plant. If the replacement strainers 44 and the suction pipe 48 are predicted to move a larger distance in response to predicted loads, then the size of both annular space 66 and central portion 80 of seal 72 may be larger. But, in any event, the seal 72 may be sized so that the suction pipe 48 is allowed sufficient room to move transversely, radially or rotationally in response to the largest predicted force placed upon the combined suction line 42 and the replacement strainers 44.

In addition, both the boot 64 and the seal 72 may be sized to easily accommodate any installation differences that may be present due to existing penetrations and complicated piping systems. The seal 72 is also relatively easily disassembled to allow for penetration leakage testing or ECCS suction line repair.

The present invention therefore provides a relatively simple replacement flexible penetration attachment 60 for connecting trains of strainers 44 submerged within a wet-well pool 26 to a suction pipe 48 through the existing apertures 62 in the wet-well wall 52. The flexible penetration attachment allows connection through an existing penetration without transferring significant loading for which the original penetration was not designed to absorb, and also minimizes leakage through the penetration.

The features and objects of this invention have been disclosed. But it should be realized that the various changes and modifications that are possible will be self-evident to those of skill in the art in which the present invention pertains, and may be made without departing from the scope of the invention, which is limited only by the appended claims.

What is claimed is:

1. A flexible penetration attachment for resiliently interconnecting a suction line through an aperture in a wall of a pool of liquid, comprising:

a boot defining an outer circumference of the aperture, the aperture having a first diameter;

first and second fasteners, a suction pipe having an outer surface and an outer diameter, said suction pipe extending through and movable within the aperture, said outer diameter being less than said first diameter such that a space is defined between said outer circumference and said outer surface; and a resilient seal having a first end and a second end, wherein said first end is fixedly secured to said movable suction pipe outer surface by the first fasteners extending through said resilient seal and said second end is fixedly secured to said aperture outer circumference by the second fasteners extending through said resilient seal.

2. A flexible penetration attachment as in claim 1, wherein said resilient seal is generally U-shaped.

3. A flexible penetration attachment as in claim 1, wherein said space is annular.

4. A flexible penetration attachment as in claim 3, wherein said space is sized so that said suction pipe moves a pre-determined transverse, radial or rotational distance within said space in response to a force.

5. In a nuclear power plant having at least one suction line in communication with liquid in a wet-well pool thorough an aperture in a wall of the wet-wall, a flexible penetration attachment for connecting the suction line to the aperture in the pool, comprising:

a boot defining an outer circumference of the aperture;

first and second fasteners;

a suction pipe having an outer surface, said suction pipe extending through and movable within the aperture such that a space is defined between said aperture outer circumference and said suction pipe outer surface; and a resilient seal within said space, said resilient seal having a first end and a second end, wherein said first end is fixedly secured to said movable pipe outer surface by the first fasteners extending through said resilient seal and said second end is fixedly secured to said outer circumference by the second fasteners extending through said resilient seal.

6. A flexible penetration attachment as in claim 5, wherein said resilient seal is generally U-shaped.

7. A flexible penetration attachment as in claim 5, wherein said first and second ends are secured by straps.

8. A flexible penetration attachment as in claim 5, wherein said space is annular.

9. A flexible penetration attachment as in claim 8, wherein said space is sized so that said suction pipe moves a pre-determined transverse, radial or rotational distance within said space in response to a force.

10. A flexible penetration attachment as in claim 5, wherein said boot is separately fabricated.

11. A flexible penetration attachment as in claim 1, wherein said first and second ends are secured by straps.

12. A flexible penetration attachment as in claim 11, wherein said first and second fasteners extending thorough said resilient seal also extend through said straps.

13. A flexible penetration attachment as in claim 7, wherein said first and second fasteners extending through said resilient seal extend through said straps.

14. A flexible penetration as in claim 1, wherein said resilient seal is fabricated from an elastomeric compound.

15. A flexible penetration as in claim 1, wherein said first fasteners extending through said resilient seal also extend through said suction pipe.

16. A flexible penetration as in claim 1, wherein said fasteners extending through said resilient seal are bolts.

17. A flexible penetration as in claim 5, wherein said resilient seal is fabricated from an elastomeric compound.

18. A flexible penetration as in claim 5, wherein said first fasteners extending through said resilient seal also extend through said suction pipe.

19. A flexible penetration as in claim 5, wherein said fasteners extending through said resilient seal are bolts.

* * * * *